(12) United States Patent
Waldman et al.

(10) Patent No.: US 10,711,630 B2
(45) Date of Patent: Jul. 14, 2020

(54) RETENTION AND CONTROL SYSTEM FOR TURBINE SHROUD RING

(71) Applicant: HONEYWELL INTERNATIONAL INC., Morris Plains, NJ (US)

(72) Inventors: David R. Waldman, Chandler, AZ (US); Donald W. Tillman, Fountain Hills, AZ (US); Ryon James Stanley, Gilbert, AZ (US); Edwin Martinez, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 140 days.

(21) Appl. No.: 15/926,137

(22) Filed: Mar. 20, 2018

(65) Prior Publication Data

US 2019/0292929 A1 Sep. 26, 2019

(51) Int. Cl.
*F01D 11/08* (2006.01)
*F01D 5/28* (2006.01)
(Continued)

(52) U.S. Cl.
CPC .............. *F01D 11/08* (2013.01); *F01D 5/284* (2013.01); *F01D 11/003* (2013.01); *F01D 11/16* (2013.01);
(Continued)

(58) Field of Classification Search
CPC .............. F05D 2240/11; F05D 2240/57; F05D 2230/64; F05D 2260/30; F01D 11/08;
(Continued)

(56) References Cited

U.S. PATENT DOCUMENTS 4,025,227 A * 5/1977 Greenberg ............ F01D 17/162
415/160
4,565,492 A * 1/1986 Bart ........................ F01D 11/18
415/116
(Continued)

FOREIGN PATENT DOCUMENTS

EP 2530253 A1 12/2012
EP 3051071 A1 8/2016

OTHER PUBLICATIONS

Levy, Dawn, "Ceramic Matrix Composites Take Flight in Leap Jet Engine," Retrieved on Jan. 15, 2018 from https://phys.org/news/2017-01-ceramic-matrix-composites-flight-jet.html, dated Jan. 4, 2017.

*Primary Examiner* — David E Sosnowski
*Assistant Examiner* — Danielle M. Christensen
(74) *Attorney, Agent, or Firm* — Lorenz & Kopf, LLP (57) ABSTRACT

A retention and control system includes a rotor configured to rotate about an axis. A shroud ring has a peripheral groove and surrounds the rotor with a clearance defined between the rotor and the ring. A support ring engages the shroud ring in the peripheral groove and axially locates the shroud ring. The support ring includes a series of tabs, each with an aperture, projecting radially outward from the support ring. A retention spring engages the support ring radially outward from the shroud ring and includes a series of openings, one of which registers with each of the apertures. An alignment pin extends through each of the registered openings and apertures to locate the support ring and the engaged shroud ring concentrically with the turbine about the axis.

20 Claims, 8 Drawing Sheets

(51) Int. Cl.
*F01D 25/24* (2006.01)
*F01D 11/00* (2006.01)
*F01D 11/16* (2006.01)

(52) U.S. Cl.
CPC .......... *F01D 25/24* (2013.01); *F01D 25/246* (2013.01); *F05D 2220/32* (2013.01); *F05D 2230/64* (2013.01); *F05D 2240/11* (2013.01); *F05D 2240/57* (2013.01); *F05D 2260/30* (2013.01); *F05D 2300/6033* (2013.01)

(58) Field of Classification Search
CPC ........ F01D 11/003; F01D 11/16; F01D 11/24; F01D 11/14; F01D 11/12; F01D 11/122; F01D 11/125; F01D 11/127; F01D 11/18; F01D 11/20; F01D 25/24; F01D 25/246
See application file for complete search history.

(56) References Cited

U.S. PATENT DOCUMENTS

| | | | |
|---|---|---|---|
| 4,576,548 A * | 3/1986 | Smed | F01D 11/005 |
| | | | 277/359 |
| 4,786,232 A | 11/1988 | Davis et al. | |
| 5,330,321 A | 7/1994 | Roberts et al. | |
| 6,025,062 A | 2/2000 | Krenkel et al. | |
| 6,932,566 B2 | 8/2005 | Suzumura et al. | |
| 7,434,670 B2 | 10/2008 | Good et al. | |
| 7,563,071 B2 | 7/2009 | Campbell et al. | |
| 7,641,440 B2 | 1/2010 | Morrison et al. | |
| 7,874,059 B2 | 1/2011 | Morrison et al. | |
| 8,079,807 B2 * | 12/2011 | Shapiro | F01D 25/246 |
| | | | 415/173.1 |
| 8,167,546 B2 | 5/2012 | Shi et al. | |
| 9,175,579 B2 | 11/2015 | Franks et al. | |
| 9,266,618 B2 | 2/2016 | Tillman et al. | |
| 10,323,535 B2 * | 6/2019 | Davis | F01D 11/18 |
| 2014/0004293 A1 | 1/2014 | Grooms, II et al. | |
| 2015/0322806 A1 | 11/2015 | Twelves, Jr. et al. | |
| 2016/0102572 A1 | 4/2016 | O'Leary | |
| 2016/0222812 A1 | 8/2016 | Sippel et al. | |
| 2016/0348528 A1 | 12/2016 | Vetters et al. | |
| 2017/0081979 A1 | 3/2017 | Fitzpatrick et al. | |
| 2017/0175572 A1 | 6/2017 | Vetters | |
| 2017/0260869 A1 | 9/2017 | Vetters et al. | |

* cited by examiner

RETENTION AND CONTROL SYSTEM FOR TURBINE SHROUD RING

STATEMENT REGARDING FEDERALLY SPONSORED RESEARCH OR DEVELOPMENT

This invention was made with Government support under contract number DTFAWA-15-A-80017 awarded by the Federal Aviation Administration. The Government has certain rights in the invention.

TECHNICAL FIELD

The present invention generally relates to turbines, and more particularly relates to a system to retain and control the position of a turbine shroud ring.

BACKGROUND

In gas turbine engines, the operational clearances between static engine structures and the tips of rotating blades impact performance aspects such as the thermodynamic efficiency and fuel burn of the engine. It is desirable to reduce the operational clearances, while at the same time avoiding contact between the rotating blade tips and the static structure. The performance improvement value of as little as a tenth of a millimeter in clearance reduction is significant. In response to thermal excursions, the lengths of the blade tips typically vary at a different rate than that at which the static structures expand or contract. Variation in position or concentricity leads to a need for greater clearances and suboptimal performance. For example, without excess clearance, the blade tips may contact the static structure negatively impacting engine performance. Excess clearance between the blade tips and the static structure may also reduce engine performance. When engine designs result in higher temperatures such as to achieve greater efficiency, maintaining optimal clearance without excess cooling air becomes more challenging.

Accordingly, it is desirable to provide systems that effectively retain and control the position of the static structure relative to the blade tips. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a retention and control system includes a rotor configured to rotate about an axis. A shroud ring has a peripheral groove and surrounds the rotor with a clearance defined between the rotor and the shroud ring. A support ring engages the shroud ring in the peripheral groove and axially locates the shroud ring. The support ring includes a series of tabs, each with an aperture, and each projecting radially outward from the support ring. A retention spring engages the support ring radially outward from the shroud ring and includes a series of openings, one of which registers with each of the apertures. An alignment pin extends through each of the registered openings and apertures to locate the support ring and the engaged shroud ring concentrically with the turbine about the axis.

In other embodiments, a retention and control system includes a rotor that rotates about an axis and has a series of blades each of which projects radially outward from the axis to a blade tip. A shroud ring made of a non-metallic material has a peripheral groove and surrounds the series of blades with a clearance defined between the blade tips and the shroud ring. A support ring made of a metallic material engages the shroud ring in the peripheral groove to axially locate the shroud ring. The support ring defines a troughed section that is disposed in the peripheral groove and includes a series of tabs, each with an aperture, and each projecting radially outward from the troughed section. A retention spring is engaged with the support ring radially outward from the shroud ring, and applies a radially inwardly directed force on the support ring in the troughed section. An alignment ring has a series of alignment blocks each defining an opening. One of the alignment blocks is aligned with each tab. An alignment pin extends into each of the aligned apertures and openings to locate the support ring and the engaged shroud ring concentrically about the axis with the rotor, and to retain and control positioning of the shroud ring to maintain the clearance.

In additional embodiments, a retention and control system includes a rotor configured to rotate about an axis. A shroud ring made of a non-metallic material with high temperature stability has a peripheral groove and surrounds the rotor with a clearance defined between the rotor and the ring. A support ring engages the shroud ring in the peripheral groove to axially locate the shroud ring. The support ring includes a series of tabs, each with an aperture, and each projecting radially outward from the support ring. A retention spring engages the support ring radially outward from the shroud ring and includes a series of openings, one of which registers with each of the apertures. An alignment pin extends through each registered opening and aperture to locate the support ring and the engaged shroud ring concentrically about the axis with the turbine. The support ring, the retention spring, and the alignment pins together retain and control positioning of the shroud ring to maintain the clearance.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, a manner of retaining and controlling the position of a shroud ring such as one that surrounds a turbine rotor, is accomplished through the use of a non-metallic shroud ring held in place by a series of retention modules that provide controlled axial location, concentric positioning and that uniformly spread the load on the non-metallic ring. When exposed to very high temperatures, the area surrounding the blade tips of the turbine rotor, particularly in a high-pressure turbine located adjacent the combustor exit as in the exemplary embodiment, is subject to thermal reactions and stress that create significant challenges in maintaining optimal tip clearance. Minimizing growth of the static structure that surrounds the rotor blades, as well as controlling its position and concentricity enables minimizing the design clearance leading to performance improvements. As described herein, cooling of the static structure is provided as is precise location and control. The current embodiment also uses a non-metallic shroud ring to minimize thermal growth and to maintain optimal clearance over a range of operating conditions.

In the examples given herein, a retention and control system is described in association with a high-pressure turbine for an aircraft gas turbine engine, but the disclosure is not limited in utility to such application. In the example of a high-pressure turbine, the location adjacent a combustor makes the environment challenging. Accordingly, a non-metallic shroud ring with compliant axial location and concentricity features are useful. The current disclosure is applicable to other applications when positioning is needed where a rotating component is surrounded by static structures, including in high temperature environments. So, although described in the aircraft context, various features and characteristics disclosed herein may be used in other contexts and applications where a retention and position control system is useful. For example, various other engine environments, as well as different types of rotating machinery will benefit from the features described herein. Thus, no particular feature or characteristic is constrained to an aircraft or a gas turbine engine, and the principles are equally embodied in other vehicles, or in other equipment, such as power generators or compressors, and in other applications.

Figure 1:
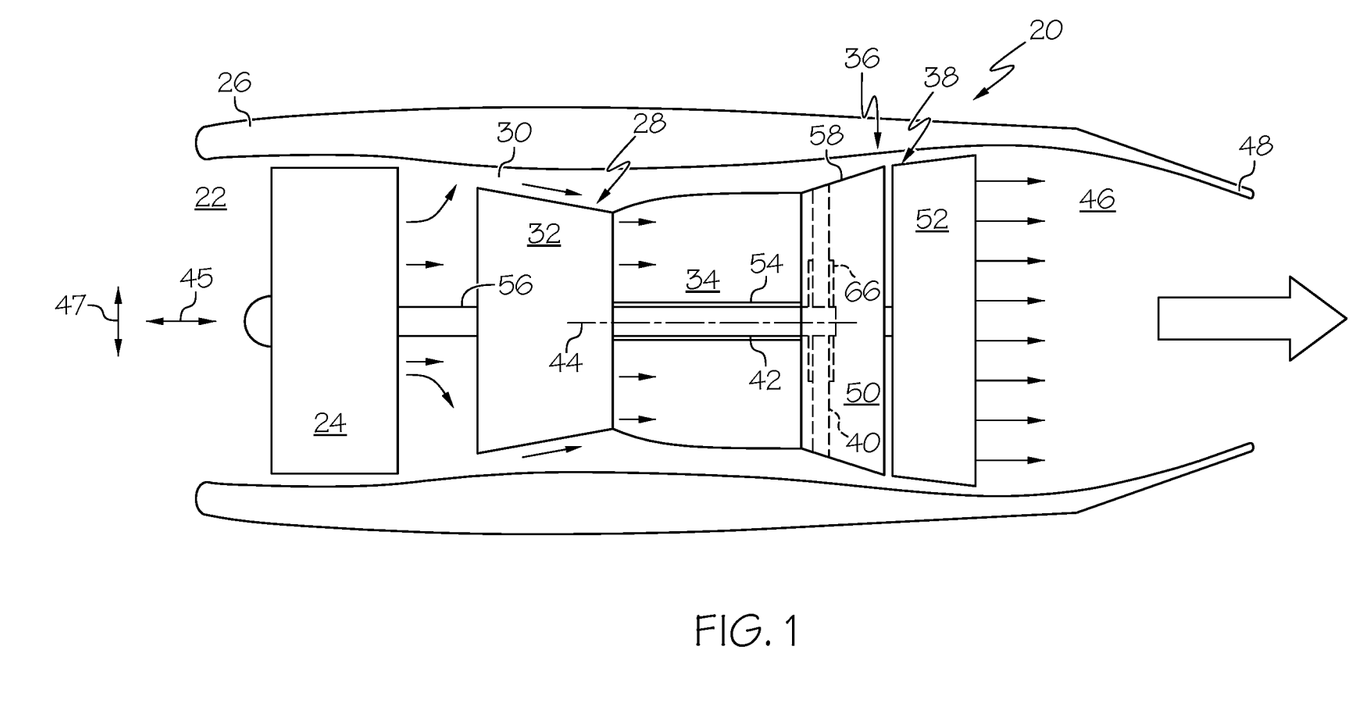
FIG. 1 is a schematic cross-sectional illustration of a gas turbine engine, according to an exemplary embodiment.

As noted above, the retention and control system described herein may be employed in a variety of applications. By way of an exemplary embodiment as illustrated in FIG. 1, an engine 20 is configured as a gas turbine engine for aircraft propulsion. The engine 20 includes an intake 22, with a fan section 24 disposed in a fan case 26. The fan section 24 draws air into the engine 20 and accelerates it. The air is directed through two paths, one to the engine core 28, and another through a bypass duct 30. A compressor section 32 compresses the air delivered to the engine core 28 and sends it to a combustion section 34. In the combustion section 34 the air is mixed with fuel and ignited for combustion. Combustion air is directed into a turbine section 36. The hot, high-speed air flows within the turbine case 38 and over the turbine blades 40 which spin on a shaft 42 about an axis 44. The axis 44 defines an axial direction 45, with a radial direction 47 projecting from the axis 44 and normal thereto. The air from the turbine section 36 rejoins that from the bypass duct 30 and is discharged through an exhaust section 46 including through a propulsion nozzle 48.

The turbine section 36 includes one or more turbines. In the depicted embodiment, the turbine section 36 includes two turbines, a high-pressure turbine 50, and a low-pressure turbine 52. However, it will be appreciated that the engine 20 may be configured with a different number of turbines. As the turbines 50, 52 rotate, they drive equipment in the engine 20 via concentrically disposed shafts or spools. Specifically, the high-pressure turbine 50 drives the compressor via a high-pressure spool 54 including the shaft 42, and the low-pressure turbine 52 drives the fan via a low-pressure spool 56.

The high-pressure turbine 50 includes a case 58 that may be assembled from a number of components as described below. Due to proximity to the combustion section 34, the case 58 is subjected to very high temperatures and therefore, may include cooling features that use the non-combustion air flowing through the bypass duct 30 for impingement cooling. However, to further address thermal responses such as expansion and contraction, along with the high rotational speeds of the high-pressure turbine 50, precise retention and position control of the components as well as the use of materials with high temperature stability may be added.

Figure 2:
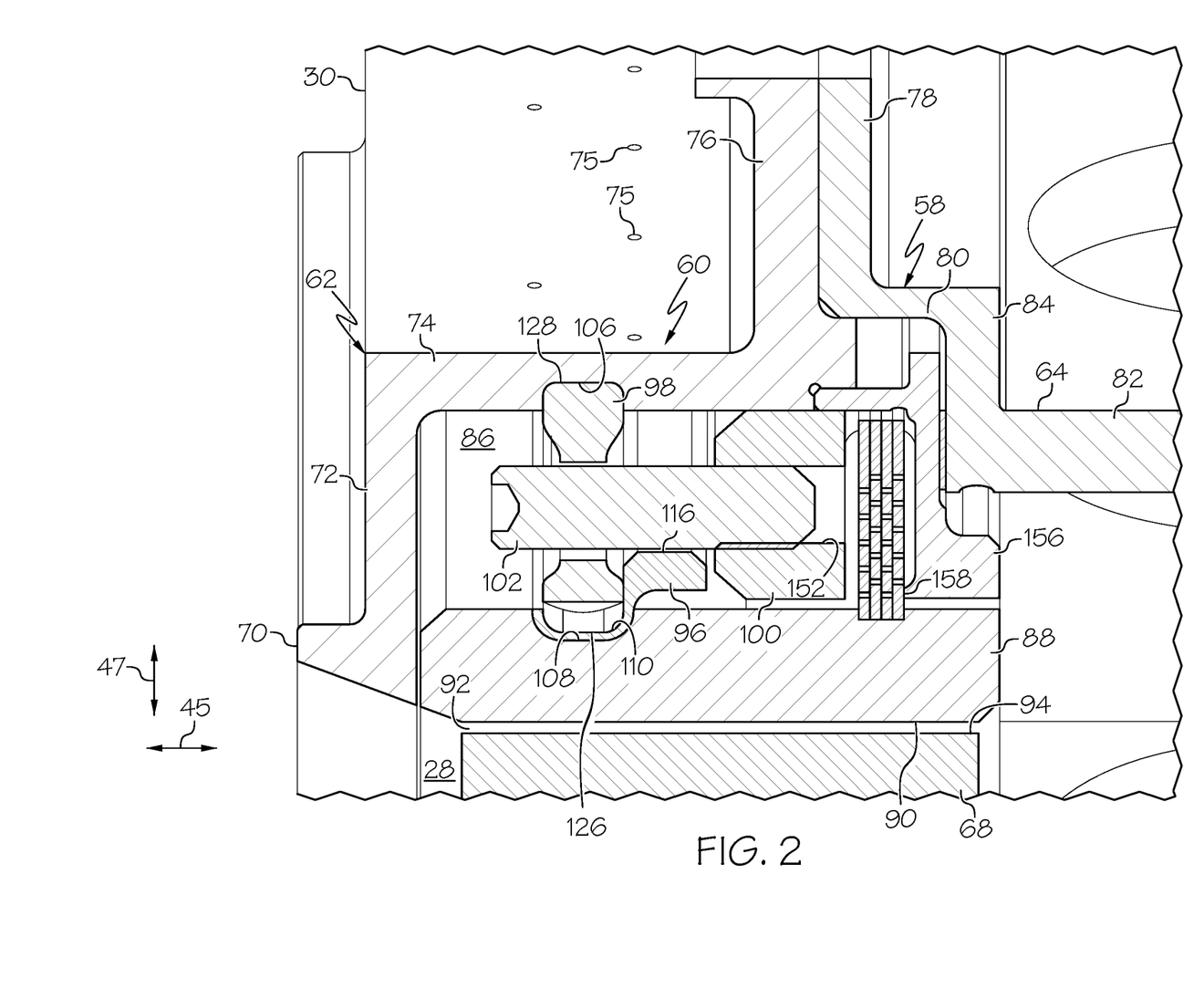
FIG. 2 is a fragmentary, cross-sectional illustration of part of a retention and control system of a turbine shroud ring, according to the exemplary embodiment.

With reference to FIG. 2, an area of the case 58 is illustrated removed from the engine 20 for clarity and shows components of a retention and control system 60. The case 58 separates the bypass duct 30 from the engine core 28 and includes a high-pressure turbine case section 62 and a mating case section 64. The case 58 and the retention and control system 60 extend around the circumference of the engine 20 and around the rotating rotor 66, surrounding the turbine blades represented by blade 68. The high-pressure turbine case section 62 has an upstream end 70 that mates with the combustion section 34 (shown in FIG. 1), and includes a radially outward directed wall 72 and an axially directed wall 74, which includes cooling holes 75. A flange 76 extends from the axially directed wall 74. The case section 64 includes a flange 78 that mates with the flange 76 and includes axially directed walls 80, 82 joined by radially directed wall 84.

Together, the high-pressure turbine case section 62 and the case section 64 define a cavity 86 within which the retention and control system 60 resides to maintain position of a shroud ring 88 as part of the static (non-rotating), structure of the engine 20. The cooling holes 75 allow air from the bypass duct 30 into the cavity 86 to reduce thermal expansion. The shroud ring 88 is shaped in the form of a ring and includes a face side 90 surrounding the rotor 66 and facing the turbine blades 68. A clearance 92 is established between the face side 90 of the shroud ring 88 and the tip 94 of the blade 68. The turbine blade tip-to-static structure clearance 92 is established and maintained by retaining the shroud ring 88 and by controlling its location through the retention and control system 60. The shroud ring 88 is made of a non-metallic material with high temperature stability, which in the current embodiment is a ceramic-matrix-composite (CMC), such as silicon carbide with ceramic fibers embedded in a ceramic matrix (SiC/SiC). In other embodiments, the shroud ring may be made of another non-metallic such as other ultra-high temperature ceramics, high-temperature monolithics, fibrous monolithic ceramics, or others. The clearance 92 has a significant effect on performance of the engine 20, including on fuel consumption. To maintain a tight clearance 92 with the rotor 66 in the high temperature environment, in addition to the use of a non-metallic material, the shroud ring 88 is cooled through the cooling holes 75 to reduce the thermal stress. The retention and control system 60 accurately locates and positions the shroud ring 88 axially and concentrically with the rotor 66, and uniformly spreads loading around the shroud ring 88.

In general, the retention and control system 60 includes a support ring 96, a retention spring 98, an alignment ring 100, and alignment pins 102, along with features of the high-pressure turbine case section 62 and of the shroud ring 88. The high-pressure turbine case section 62 includes an internal groove 106 formed in the axially extending wall 74 and facing into the cavity 86 and toward the axis 44. The shroud ring 88 includes a peripheral groove 108, which also faces into the cavity 86, in this case away from the axis 44, and which is axially aligned with the internal groove 106. The support ring 96 is made of metal for strength, and has a troughed section 110 in the form of a band that is shaped to mate with the peripheral groove 108. The shape of the troughed section 110 with a thin wall minimizes the amount of material that is used, and provides a mating shape for the retention spring 98. With additional reference to FIG. 3, the support ring 96 also includes a series of tabs 111-115 that are positioned on its downstream side and that project radially outward. Each of the tabs 111-115 has an aperture 116 that is open through the tab in the axial direction 45 and that opens through their outer ends 118 so that the tabs 111-115 are forked. The support ring 96 is annular in shape and is split with a gap 120, and has two ends 122, 124 facing each other across a gap 120.

Figure 3:
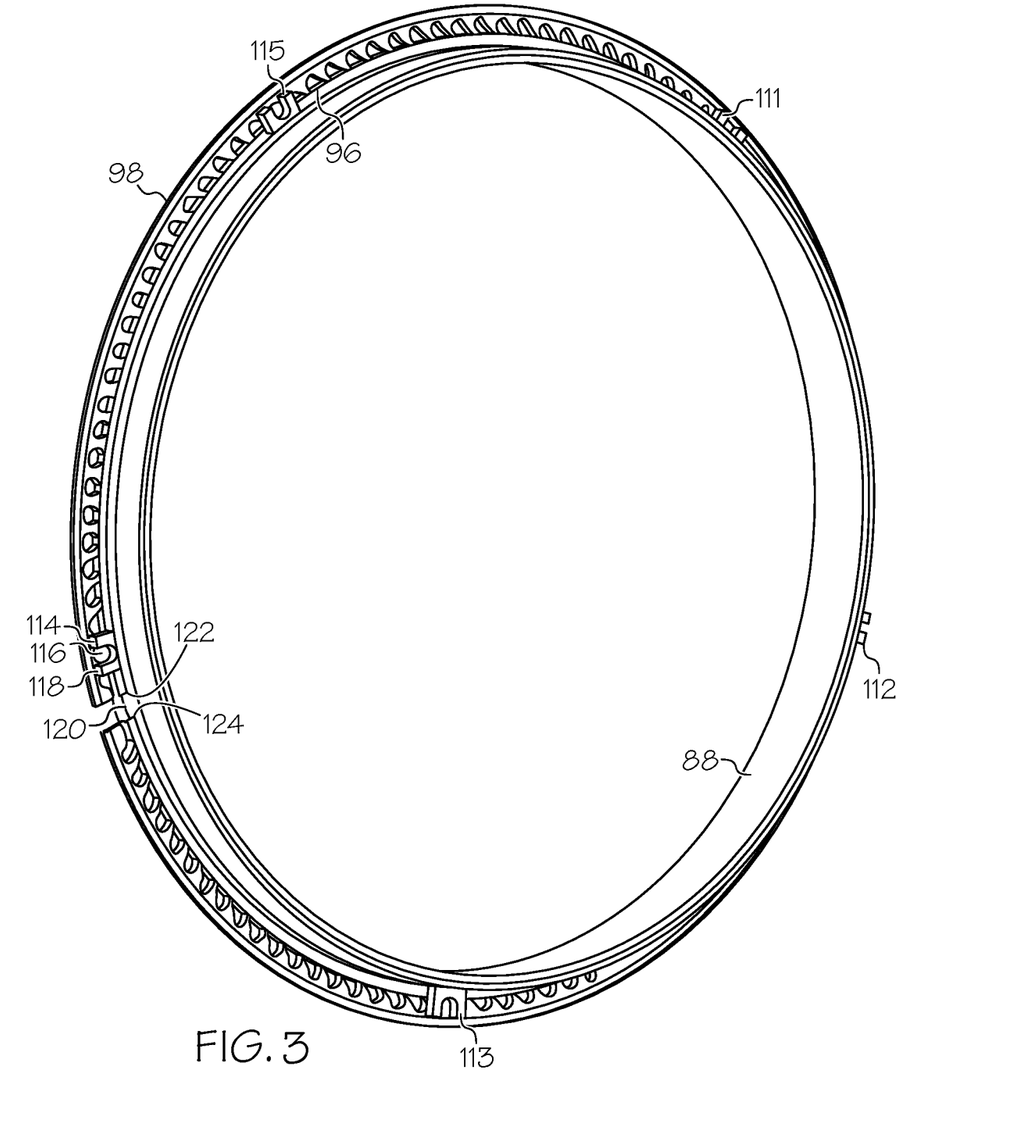
FIG. 3 is a fragmentary, cross-sectional illustration of part of a turbine case showing a shroud ring, support ring and retention spring, according to the exemplary embodiment.
Figure 4:
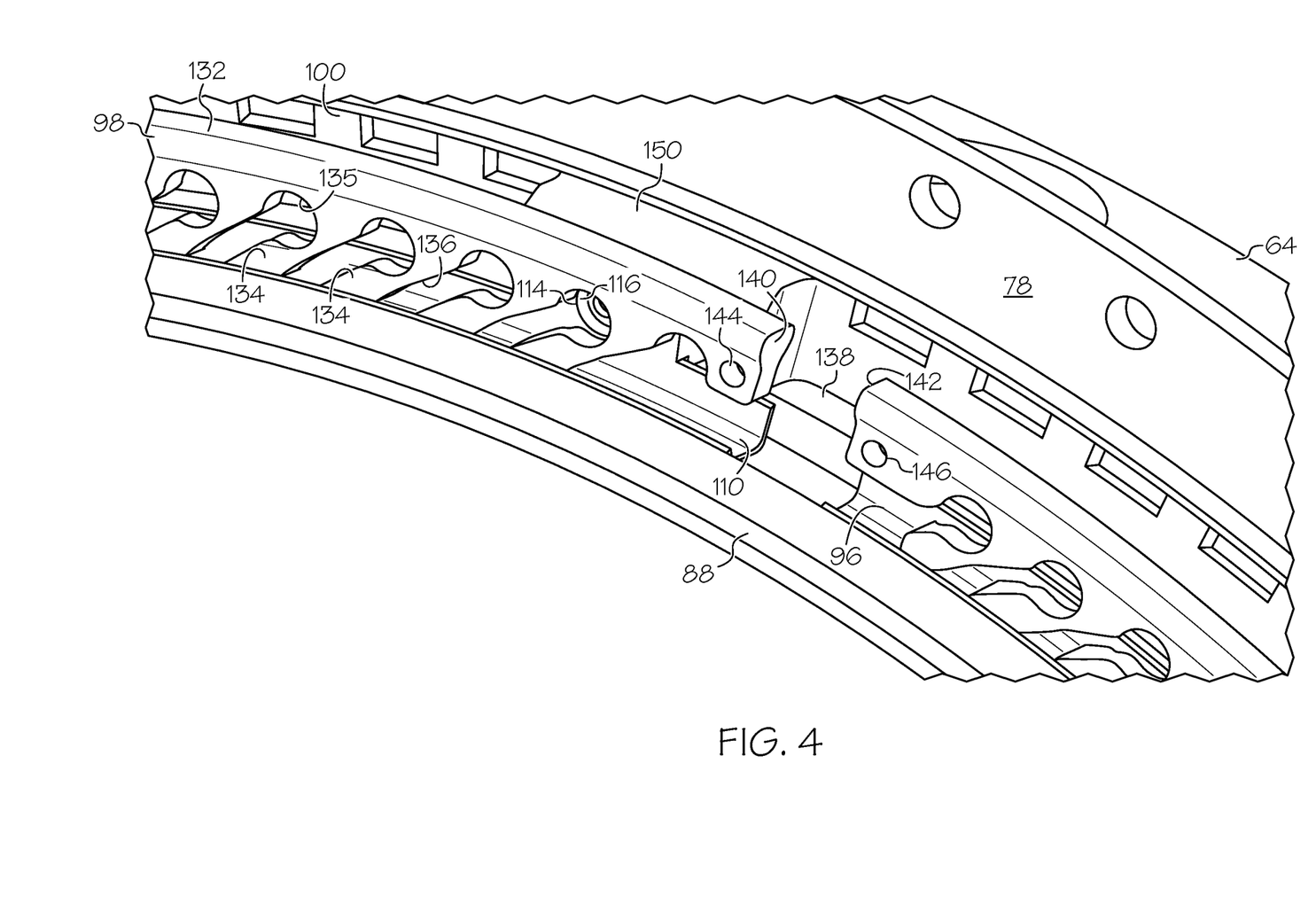
FIG. 4 is a fragmentary, perspective illustration of part of a retention and control system of a turbine shroud ring showing an alignment ring, the shroud ring, a retention spring and an interposed support ring, according to the exemplary embodiment.

The retention spring 98 includes an inner perimeter 126 seated in the troughed section 110 clamping it into the peripheral groove 108 without direct contact between the retention spring 98 and the shroud ring 88. The retention spring 98 also has an outer perimeter 128 that is disposed in the internal groove 106. Referring additionally to FIG. 4, the retention spring 98 has an outer rail 132 with legs 134 extending from the outer rail 132 generally toward the axis 44. Each leg 134 is spaced from its adjacent legs by slots 136 that extend partly through the retention spring 98 and that are disposed at an inclined angle and end in a round opening 135 near the outer rail 132. The legs 134 distribute the load applied by the retention spring 98 evenly around the shroud ring 88 and act as an anti-rotation device to keep the shroud ring 88 static. The retention spring 98 is annular in shape and is split with a gap 138. The retention spring 98 has two ends 140, 142 facing each other across the gap 138. Near each end 140, 142 the retaining ring includes a tool feature 144, 146 respectively, such as compression holes. The retention spring 98 is configured so that a tool may be inserted into the tool features 144, 146 and then used to draw the ends 140, 142 toward each other to compress the retention spring 98 for insertion into the internal groove 106 during assembly.

Figure 5:
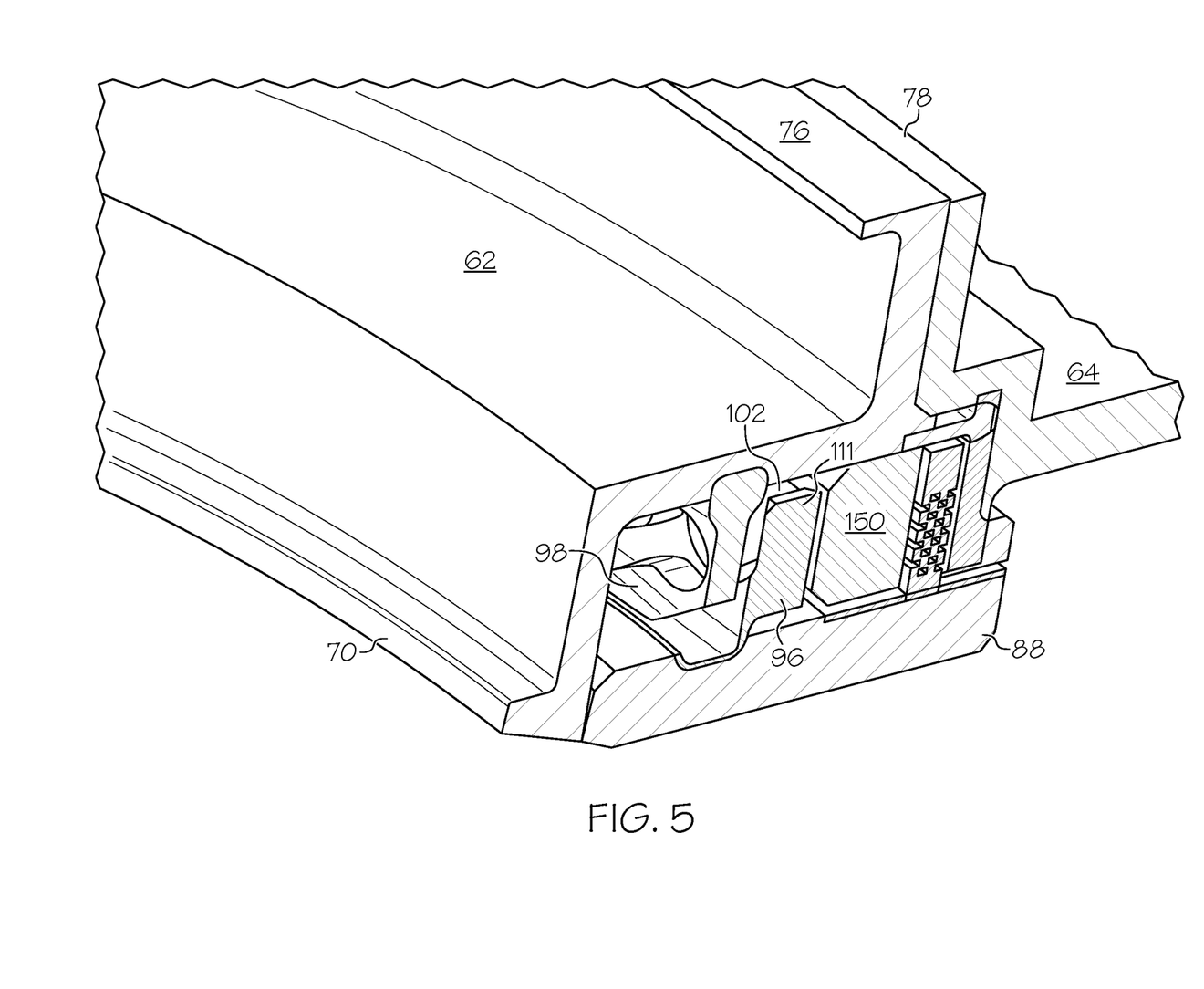
FIG. 5 is a fragmentary, sectioned, perspective illustration of part of a retention and control system of a turbine shroud ring, according to the exemplary embodiment.
Figure 6:
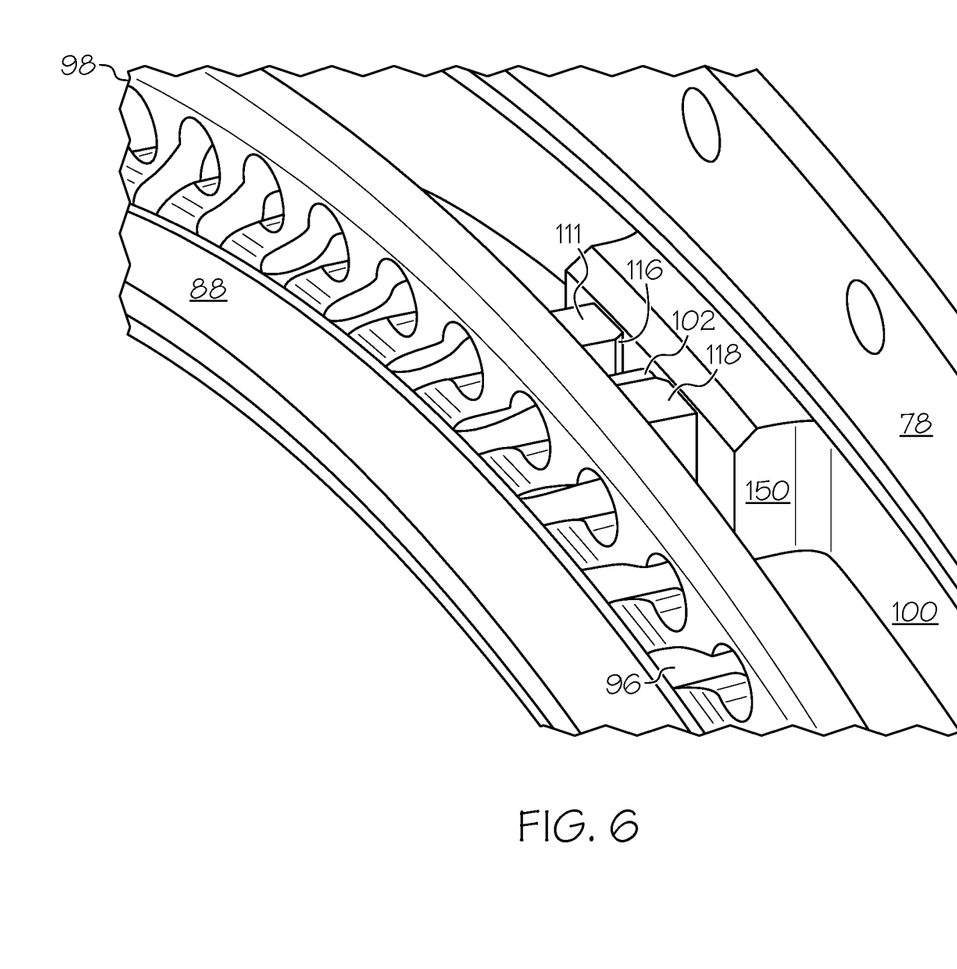
FIG. 6 is a fragmentary, perspective illustration of part of a retention and control system of a turbine shroud ring, according to the exemplary embodiment.
Figure 7:
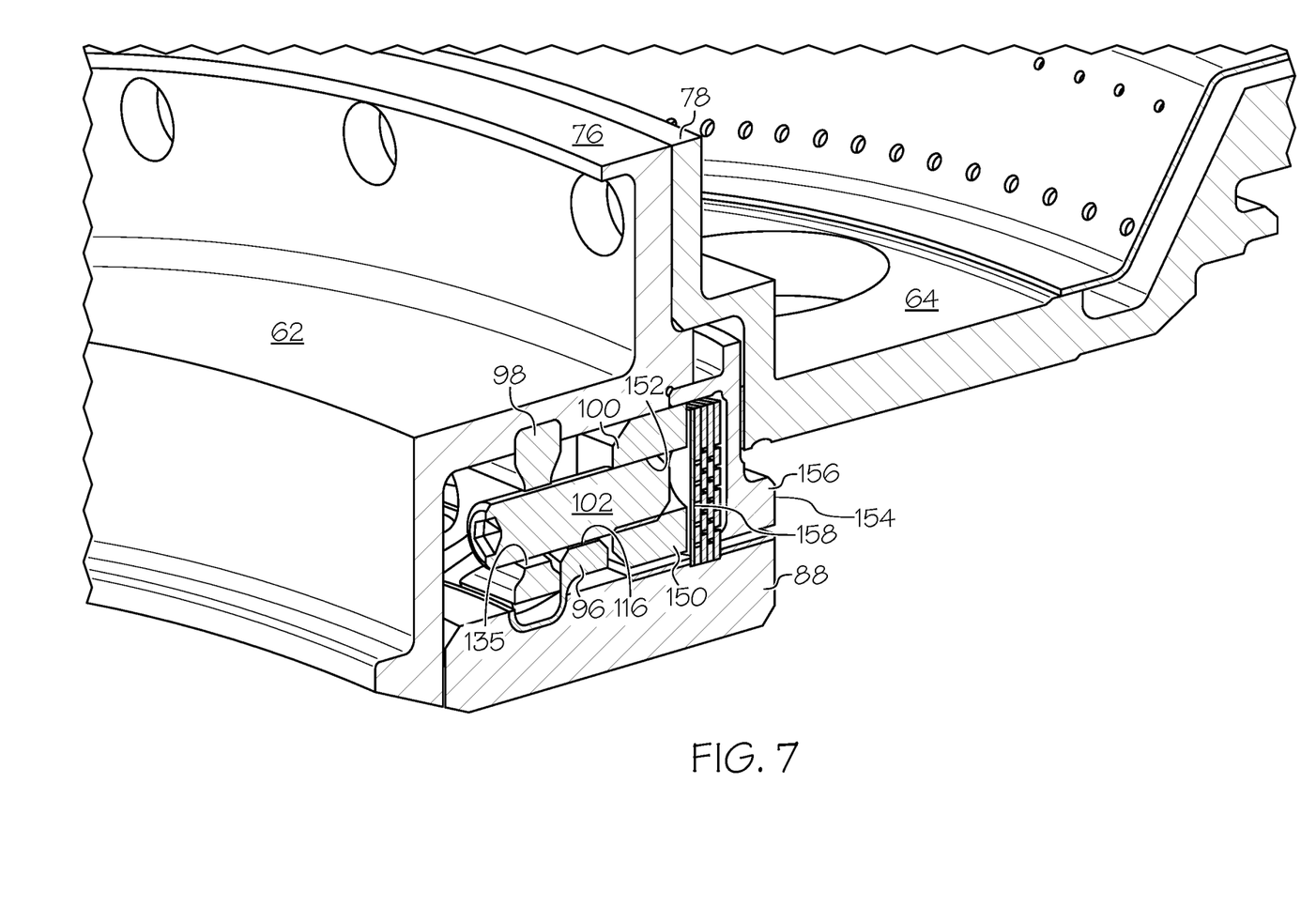
FIG. 7 is a fragmentary, sectioned, perspective illustration of part of a retention and control system of a turbine shroud ring, according to the exemplary embodiment.

The alignment ring 100 is positioned adjacent the support ring 96 on its downstream side and includes a series of alignment blocks 150 that extend axially toward the support ring 96, with one registering with the location of each of the tabs 111-115. Each alignment block 150 includes an opening 152 that extends through in the axial direction 45. The alignment ring 100 contacts the axially directed wall 74 of the high-pressure turbine case section 62 centering it therein. With additional reference to FIGS. 5 and 6, the apertures 116 of the tabs 111-115 are aligned with the openings 152 of the alignment blocks 150. A alignment pin 102 is positioned in each paired aperture 116 and opening 152. In the current embodiment there are five alignment pins 102, which has been found to be the minimum number for ensuring concentricity in this application. In other embodiments, additional alignment pins 102 may be used along with additional corresponding tabs and alignment blocks. The alignment pins 102 are press fit into the openings 152. During assembly, the retention spring 98 and the support ring 96 are installed into the high-pressure turbine case section 62 prior to addition of the alignment pins 102 and the alignment ring 100. As the alignment pins 102 enter the apertures 116 during assembly, the support ring 96 and the shroud ring 88 are centered to be concentric with the rotor 66 about the axis 44. In other embodiments, the alignment pins 102 are connected with the case section 64 through another path, such as directly with the case section 64. As shown in FIGS. 2 and 7, each alignment pin 102 also extends through one of the round openings 135 of the retention spring 98, also providing centering and alignment for the retention spring 98. The retention and control system 60 includes a series of at least five retention modules 148 in this embodiment that include the alignment blocks 150, the tabs 111-115, the part of the retention spring 98 around the round opening 135, and the alignment pins 102. To provide retention and control, the retention modules 148 work with the remainder of the support ring 96, the retention spring 98, and the alignment ring 100, along with the shroud ring 88 and the high-pressure turbine case section 62.

Figure 8:
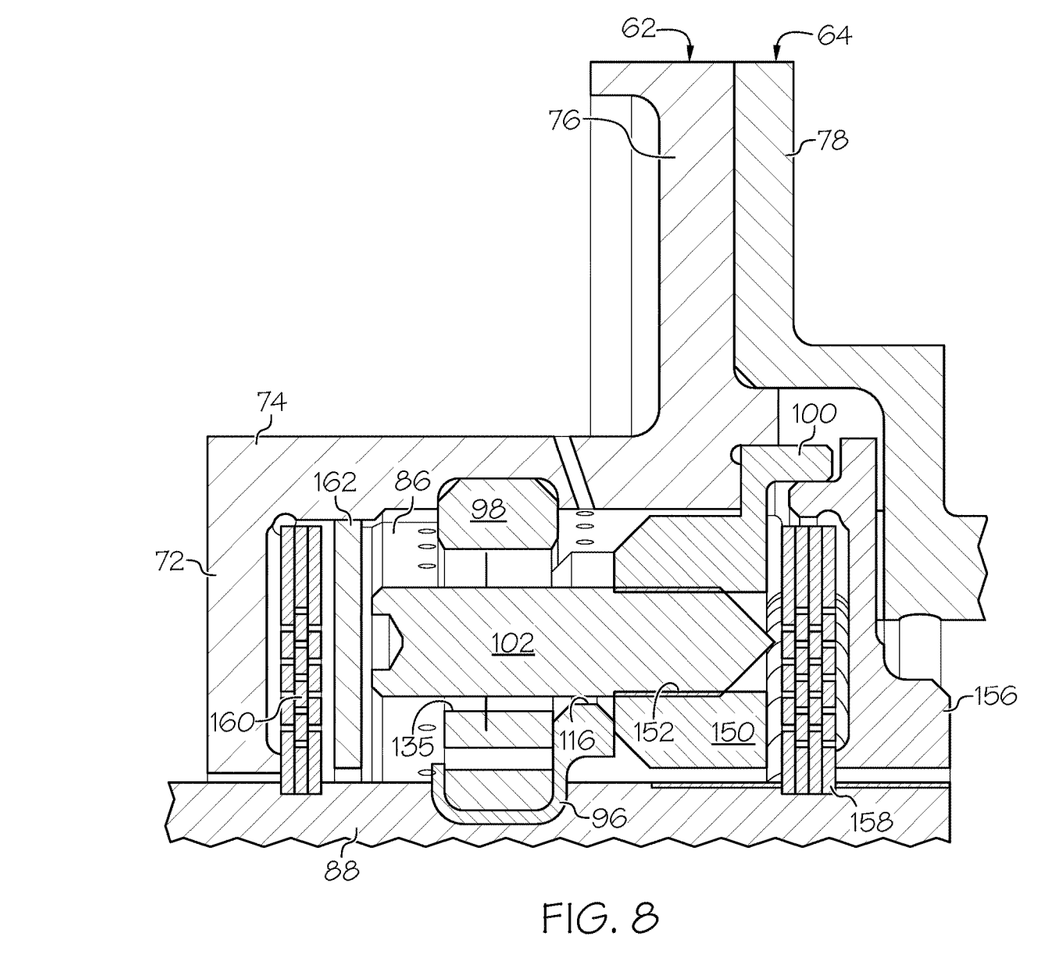
FIG. 8 is a fragmentary, cross-sectional illustration of part of a retention and control system of a turbine shroud ring, according to the exemplary embodiment.

The alignment ring 100 also serves as part of a seal cartridge 154 and along with cartridge section 156 houses a finger seal 158. Referring to FIG. 8, the illustrated embodiment includes a second finger seal 160 contained between the radially extending wall 74 and a cartridge section 162. The finger seal 160 also extends around the shroud ring 88. The combination of two seals closes the cavity 86 and maintains the cooling air flowing through the cooling holes 75.

Through the examples described herein, a system of retaining and controlling the position of an annular component is accomplished through the use of a non-metallic ring, a support ring, a retention spring, and an alignment ring that together provide controlled axial location, concentric positioning and uniformly spread the load on the non-metallic ring. Use of the non-metallic ring reduces the effect of thermal exposure, while the retention system minimizes stress on the non-metallic ring and provides precise location with ease of assembly. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A retention and control system comprising:
a rotor configured to rotate about an axis;
a shroud ring having a peripheral groove and surrounding the rotor with a clearance defined between the rotor and the shroud ring;
a support ring engaging the shroud ring in the peripheral groove and configured to axially locate the shroud ring, and the support ring including a series of tabs projecting radially outward from the support ring, each tab having an aperture;
a retention spring engaging the support ring radially outward from the shroud ring, the retention spring including a series of openings, where each opening in the series of openings registers with a corresponding one of the apertures; and
an alignment pin extending through one of the openings and one of the apertures, the alignment pin configured to locate the support ring and the engaged shroud ring concentrically with the turbine about the axis.

2. The system of claim 1, comprising at least five of the tabs and at least five of the alignment pins.

3. The system of claim 1, wherein the retention spring comprises a split ring with two ends facing each other across a gap.

4. The system of claim 1, wherein the shroud ring comprises a ceramic matrix composite material with ceramic fibers embedded in a ceramic matrix.

5. The system of claim 1, wherein the retention spring includes an outer rail with legs that extend inwardly and that engage the support ring outward from the shroud ring.

6. The system of claim 5, comprising a case that surrounds the retention spring, wherein the outer rail is engaged against the case.

7. The system of claim 5, wherein the retention spring comprises a split ring with two ends facing each other across a gap, wherein each end defines a hole configured to be used to close the gap to compress the retention spring.

8. The system of claim 1, comprising an alignment ring containing a seal, with a series of alignment blocks on the alignment ring, where each alignment block in the series of alignment blocks is aligned with one of the tabs, wherein the alignment pin extends into one of the alignment blocks and is fixed therein.

9. The system of claim 8, wherein alignment pin extends into the retention spring.

10. The system of claim 1, wherein the support ring comprises a split ring with two ends facing each other across a gap and comprises a metallic material.

11. A retention and control system comprising:
a rotor configured to rotate about an axis and having a series of blades each of which projects radially outward from the axis to a blade tip;
a shroud ring, comprising a non-metallic material, the shroud ring having a peripheral groove and surrounding the series of blades with a clearance defined between the blade tips and the shroud ring;
a support ring comprising a metallic material, engaging the shroud ring in the peripheral groove, and configured to axially locate the shroud ring, the support ring defining a troughed section disposed in the peripheral groove and including a series of tabs projecting radially outward from the troughed section, each tab having an aperture;
a retention spring engaging the support ring radially outward from the shroud ring, the retention spring configured to apply a radially inwardly directed force on the support ring in the troughed section;
an alignment ring with a series of alignment blocks each defining an opening, where each alignment block in the series of alignment blocks is aligned with one of the tabs; and
an alignment pin extending into one of the apertures and one of the openings, and configured to locate the support ring and the engaged shroud ring concentrically with the rotor about the axis, and configured to retain and control positioning of the shroud ring to maintain the clearance.

12. The system of claim 11, wherein the alignment ring comprises a seal cartridge section containing a seal, wherein the alignment pin is fixed in one of the openings.

13. The system of claim 11, comprising at least five of the tabs, at least five of the alignment blocks, and at least five of the alignment pins.

14. The system of claim 11, wherein the retention spring comprises a split ring with two ends facing each other across a gap.

15. The system of claim 11, wherein the shroud ring comprises a ceramic matrix composite material with ceramic fibers embedded in a ceramic matrix.

16. The system of claim 11, wherein the retention spring includes an outer rail with legs that extend inwardly and engage the support ring in the troughed section.

17. The system of claim 16, comprising a case that surrounds the retention spring and defines an internal groove, wherein the outer rail is engaged against the case in the internal groove.

18. The system of claim 16, wherein the retention spring comprises a split ring with two ends facing each other across a gap, wherein each end defines a hole configured to be used to close the gap to compress the retention spring.

19. The system of claim 11, wherein the rotor comprises a high-pressure turbine.

20. A retention and control system comprising:
a rotor configured to rotate about an axis;
a shroud ring, comprising a non-metallic material with high temperature stability, the shroud ring having a peripheral groove and surrounding the rotor with a clearance defined between the rotor and the shroud ring;
a support ring engaging the shroud ring in the peripheral groove and configured to axially locate the shroud ring, and the support ring including a series of tabs projecting radially outward, each tab having an aperture;
a retention spring engaging the support ring radially outward from the shroud ring, the retention spring including a series of openings, where each opening in the series of openings registers with a corresponding one of the apertures; and
an alignment pin extending through one of the openings and one of the apertures and configured to locate the support ring and the engaged shroud ring concentrically with the turbine about the axis, the support ring, the retention spring, and the alignment pins together configured to retain and control positioning of the shroud ring to maintain the clearance.

* * * * *